Nov. 27, 1934.  N. STEPHANSEN ET AL  1,982,549
PROCESS FOR THE MANUFACTURE OF NITRATE OF LIME IN GLOBULAR FORM
Filed Feb. 16, 1933
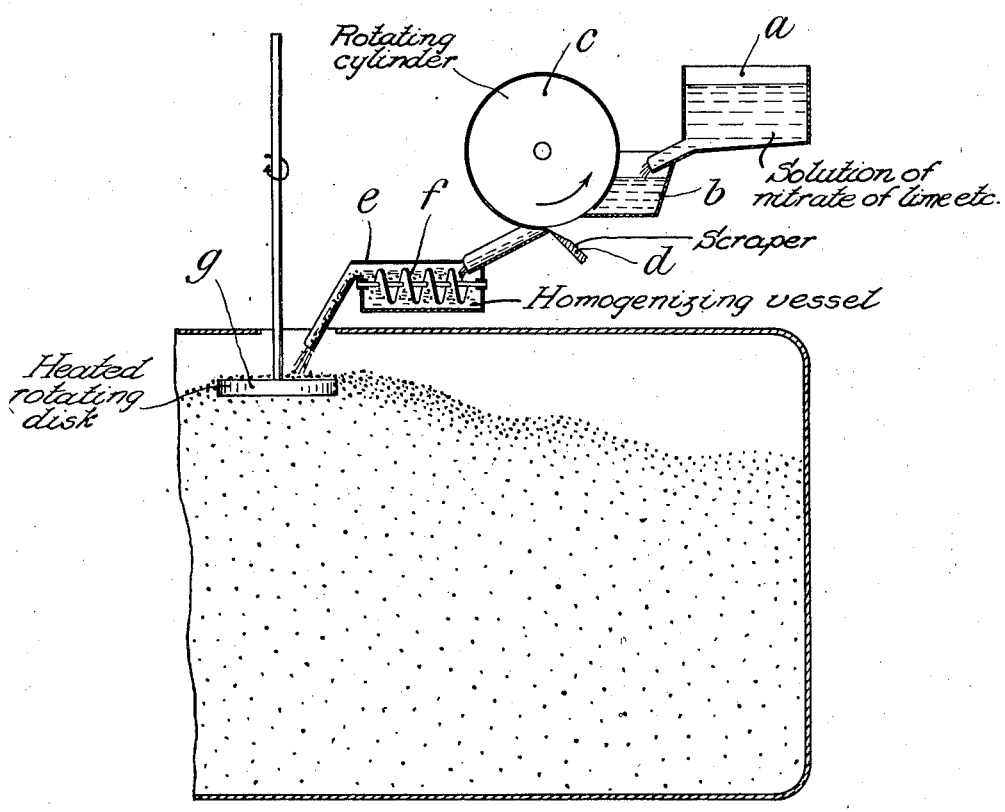
Inventors:—
Nicolai Stephansen,
Carl Eyer,
and Georg Meder, Patented Nov. 27, 1934

1,982,549

UNITED STATES PATENT OFFICE 1,982,549

PROCESS FOR THE MANUFACTURE OF NITRATE OF LIME IN GLOBULAR FORM

Nicolai Stephansen, Rjukan, Norway, and Carl Eyer, Ludwigshafen-on-the-Rhine, and Georg Meder, Munster-on-Taunus, Germany, assignors to Norsk Hydro-Elektrisk Kvaelstof-Aktieselskab, Oslo, Norway Application February 16, 1933, Serial No. 657,138
In Germany February 22, 1932

3 Claims. (Cl. 71—9)

It is known that it is possible by the addition of nitrate of ammonia to a concentrated solution of nitrate of lime to obtain a product containing 15.5 to 16% nitrogen and solidifying at a much higher temperature than the Norgesalpeter (nitrate of lime with 13% nitrogen).

It is also known that it is possible by spraying the said solution of nitrate of lime having an addition of nitrate of ammonia with compressed air to obtain a solid product adapted for being immediate spread as a fertilizer.

Further it has been suggested to transform a number of different materials and solution into solid globular form by means of the so called raindrop process, in accordance with which the liquid which is to be transformed into solid globules is not spread under pressure, but is divided in some suitable manner into drops, which are permitted to fall by gravity through air or a gas, whereby they gradually solidify in the form of smooth globular bodies. In order to prepare the liquid material or the solutions for this process it has been suggested to cool the same by means of cooled metal surfaces.

Experiments have however proved that the treatment of a solution of nitrate of lime having an addition of nitrate of ammonia in accordance with the known methods is not sufficient to prepare this particular solution for the subsequent treatment in accordance with the raindrop process.

The present invention is based on the cognition of the fact that it is possible by the use of a special kind of treatment of the concentrated solution of nitrate of lime with nitrate of ammonia to bring this solution into a form in which it is suitable for treatment in accordance with the raindrop process. The main feature of the invention lies therein that the concentrated solution after having been cooled and partially solidified by means of a cooled metal surface is carried to a heated homogenizing device, in which it is transformed at constant temperature into a uniform homogenized broth.

This broth is suitable for immediate treatment in accordance with the well known raindrop process.

In connection with the means for transforming the broth into drops it has been found convenient to utilize the centrifugal power. By using a centrifuge for spreading the liquid it is possible to obtain globules of substantially uniform size, which is considered an advantage in the practical use of the product as a fertilizer.

In accordance with the invention the thickened solution or broth is conveyed to a heated rotating disc, the temperature of which is maintained approximately equal to or somewhat higher than the temperature of the broth.

On the drawing an arrangement for carrying out the process in accordance with the present invention is diagrammatically illustrated by way of example. From the storage tank $a$ containing a solution of nitrate of lime with 4.7% nitrate of ammonia and 13.3% of water at a temperature of 100° C. the solution is conveyed to a trough $b$, one side wall of which is formed by a rotating cylinder $c$ internally cooled with water of about 20° C. This cylinder carries with it on its surface a layer of the solution from the trough, and this layer is again removed at the lowest point of the cylinder by means of a scraper blade $d$ and is conveyed to a steam heated homogenizing vessel $e$, in which a helical conveyer $f$ is rotating. In this vessel the homogenous broth is formed at a temperature of about 96° C. and is conveyed to the heated rotating disc $g$, by means of which it is transformed into drops falling by gravity through the air.

The new process involves a great advantage as compared with the previously known methods of treatment owing to the fact that it is made possible in accordance with the present method to transform the solution of nitrate of lime with an addition of nitrate of ammonia into smooth globular bodies without any formation of dross.

In this globular form the material is advantageous for several reasons, amongst which may be mentioned that the ratio of the surface to the volume of the globules is the lowest possible, whereby the amount of moisture absorbed by this hygroscopic product is reduced to a minimum. Further the product owing to the smooth globular surface is not inclined to the formation of dust or dross, which is important as well during transport as during the practical use of the product as a fertilizer. Further the specific volume of the globular product is lower than that of products of broken, uneven surfaces, whereby there is obtained a considerable saving in packing material. Further the product has a distinct advantage as a fertilizer for the reason that the running movement through the channels and discharge openings of the agricultural spreading machines is easier and more uniform the smoother the surface and the nearer the form to the perfect globular form.

We claim:

1. A process for treating solutions of nitrate of lime having an addition of nitrate of ammonia and a 15.5 to 16% nitrogen content to prepare the same for further treatment in accordance with the raindrop process for causing the solution to solidify in globular form, comprising first cooling and partially solidifying the concentrated solution on a cooled surface and then conveying the mixture of solid and liquid particles to a heated homogenizing device, transforming the mixture in said device at approximately constant temperature to a uniform broth suitable for being treated in accordance with the raindrop method.

2. A process as claimed in claim 1, comprising transferring the uniform homogenized broth to a heated disc rotating about a vertical axis for dividing the broth into drops of suitable size.

3. A process as set forth in claim 1 comprising transferring the uniform homogenized broth to a heated rotating disk for dividing the broth into drops of suitable size.

NICOLAI STEPHANSEN.
CARL EYER.
GEORG MEDER.